(12) United States Patent
Gokal

(10) Patent No.: US 7,073,874 B1
(45) Date of Patent: Jul. 11, 2006

(54) VEHICLE DRIVE

(75) Inventor: Ram Gokal, Wolverhampton (GB)

(73) Assignee: GKN Technology Limited (GB)

( * ) Notice: Subject to any disclaimer, the term of this patent is extended or adjusted under 35 U.S.C. 154(b) by 0 days.

(21) Appl. No.: 10/333,883

(22) PCT Filed: Jul. 24, 2000

(86) PCT No.: PCT/GB00/02866

§ 371 (c)(1),
(2), (4) Date: May 6, 2004

(87) PCT Pub. No.: WO02/08048

PCT Pub. Date: Jan. 31, 2002

(51) Int. Cl.
*B60T 8/00* (2006.01)

(52) U.S. Cl. ................. 303/112; 188/1.11 E; 188/18 A

(58) Field of Classification Search ................ 303/112; 188/1.11 R, 1.11 E, 18 A, 218 AL; 301/6.1, 301/6.8; 384/544; 73/847, 129, 862.64

See application file for complete search history.

(56) References Cited

U.S. PATENT DOCUMENTS

| | | | | |
|---|---|---|---|---|
| 3,298,223 A | * | 1/1967 | Dyer, Jr. ...................... 73/128 |
| 3,749,416 A | * | 7/1973 | Asberg ........................ 280/105 |
| 5,333,943 A | * | 8/1994 | Kashiwabara et al. ...... 303/112 |
| 5,974,665 A | * | 11/1999 | Frielingsdorf et al. . 29/894.361 |
| 6,138,520 A | * | 10/2000 | Chang .................... 73/862.193 |
| 6,230,555 B1 | * | 5/2001 | Doerrie et al. ................ 73/129 |
| 6,581,730 B1 | * | 6/2003 | Haydon et al. ............ 188/71.5 |
| 6,634,208 B1 | * | 10/2003 | Salou et al. ................ 73/11.07 |
| 2005/0016296 A1 | * | 1/2005 | Inoue .................... 73/862.044 |

FOREIGN PATENT DOCUMENTS

| | | |
|---|---|---|
| DE | 195 47 981 A1 | 7/1996 |
| DE | 195 81 672 T1 | 5/1997 |
| DE | 196 50 477 A1 | 4/1998 |
| EP | 0 504 731 A2 | 9/1992 |
| EP | 0 788 955 A2 | 8/1997 |
| EP | 0 806 331 A2 | 11/1997 |
| EP | 0 788 955 A3 | 6/1999 |
| JP | 4 331336 | 11/1992 |

\* cited by examiner

*Primary Examiner*—James McClellan
*Assistant Examiner*—Bradley King

(57) ABSTRACT

A rotatable assembly for a vehicle road wheel includes a vehicle suspension knuckle (16), a drive shaft (24), a first bearing (30) carried by the knuckle for rotatably supporting the drive shaft, a wheel hub (13) drivingly connected to the drive shaft, a brake disc support (26) rotatably carried by the first bearing and connected to the drive shaft to rotate therewith, the connection (28) between the brake disc support and the drive shaft being separated and spaced apart along the shaft from the connection (25) between the drive shaft and the wheel hub, a second bearing (32) between the wheel hub and the brake disc to support the wheel hub and to allow relative rotation between the brake disc support and the wheel hub and a torque sensor (50) between said connections to sense the torque or the change in torque being transmitted by the drive shaft (24) to the wheel.

3 Claims, 4 Drawing Sheets

VEHICLE DRIVE

TECHNICAL FIELD

This invention relates generally to the drivelines of motor vehicles. More particularly the invention relates to a drive assembly for a road wheel on such a vehicle and for sensing the torque transmitted by such a wheel. The invention also relates to a method of measuring such torque and to vehicle control systems which use such torque.

BACKGROUND ART

Currently both vehicle braking and vehicle drive traction are controlled by sensing the road wheel speed relative to another road wheel on the vehicle or to a pre-set algorithm. Typically 15° of road wheel rotation is needed to trigger the control system and hence a corrective action. This then involves reducing the road wheel speed sufficiently to regain traction but, because of the 15° lag in the system, the road wheel is always slowed down too much. It is then necessary to accelerate the wheel back up to speed. This system involves considerable changes of inertia and as a result a loss of power and energy. By using the torque transmitted by a wheel rather than its speed it is possible to control the driveline to prevent the road wheel reaching a situation in which it will lose traction under either acceleration or braking.

DISCLOSURE OF INVENTION

It is an object of the present invention to provide a torque sensing system which is an improvement over those presently in use.

According to the invention we provide an assembly for mounting a road wheel on a vehicle comprising a rotary component, a first bearing for supporting said component for rotation, a wheel hub carried by said component to be rotatable therewith, a brake element supported by the first bearing and connected to said component to rotate therewith, the connection between the brake element and the rotary component being separate and spaced apart along the rotary component from the connection between the rotary component and the wheel hub, means between the wheel hub and the brake element to support the wheel hub and to allow relative rotation between the brake element and the wheel hub and means to sense the torque or the change in torque being carried by the rotary component.

Preferably the support means between the wheel hub and the brake element comprises a second bearing. The torque sensing means is preferably a torque sensor located between the connection of the rotary component to the brake element and the connection of the rotary component to the wheel hub.

Preferably the first bearing has inner and outer races with interposed rolling elements and a portion of the brake element which is connected to the drive element supports or forms at least part of said inner race. Said outer race is carried by a vehicle suspension unit, e.g. a knuckle.

More specifically the invention also provides a rotatable drive assembly for a road wheel in a vehicle comprising a vehicle suspension knuckle, a drive shaft, a first bearing carried by the knuckle for supporting the drive shaft for rotation, a wheel hub connected to the drive shaft to be driven thereby, a brake disc support rotatably carried by the first bearing and connected to the drive shaft to rotate therewith, the connection between the brake disc support and the drive shaft being separate and spaced apart along the shaft from the connection between the drive shaft and the wheel hub, a second bearing between the wheel hub and the brake disc support to support the wheel hub and to allow relative rotation between the brake disc support and the wheel hub and means between said connections to sense the torque or the change in torque being transmitted by the drive shaft.

According to another aspect of the invention we provide, in a vehicle driveline, a method of measuring the torque or the change in torque transmitted by a road wheel comprising applying driving torque and braking torque separately to a rotary element connected to the road wheel and measuring the torque or change of torque in the drive element.

The measured torque may be used in a method of controlling a vehicle driveline which includes sensing the torque (or changes thereof) experienced by one or more road wheels.

We also provide a vehicle control system having, as inputs, the driving and braking torques or changes in driving and braking torques experienced by one or more road wheels. The control system may control an anti-skid braking system and/or traction control and/or change speed gear box and/or a controllable differential.

It is envisaged that the measured torque signals will be used as a primary source of information for ABS and/or traction control but could also be used to control automatic gear boxes for smooth gear shifts. The signals could also be used as input into active or controllable differentials for torque splits across output shafts.

More complex applications would be in systems such as active yaw control which controls the braking or acceleration of a road wheel when cornering.

BEST MODE FOR CARRYING OUT THE INVENTION

Figure 1:
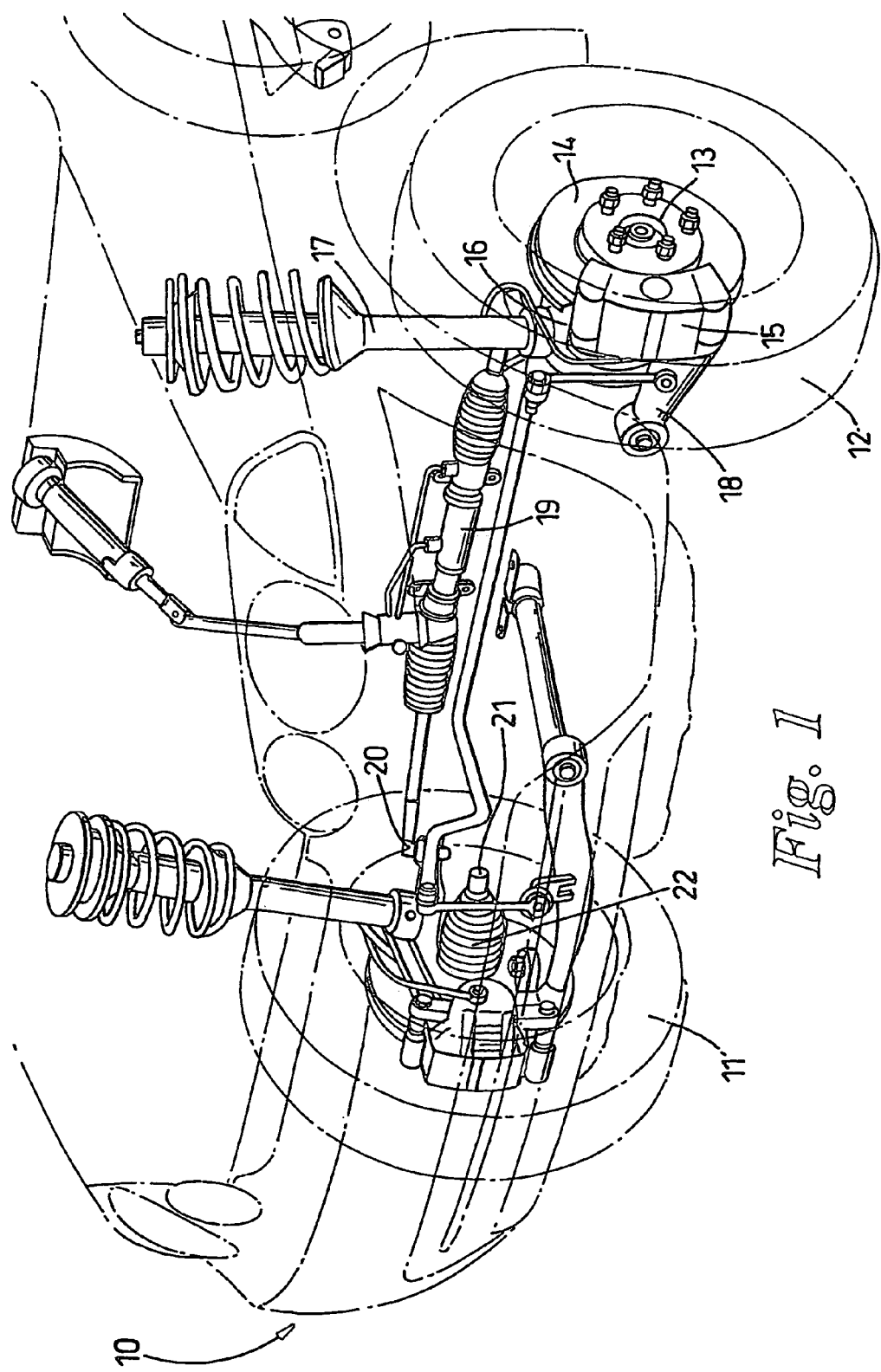
FIG. 1 is a perspective partial view of the front suspension and drive of a motor vehicle.

Referring now to FIG. 1, the front part of a motor vehicle is indicated generally at 10. There are two front driven wheels 11 and 12. The wheel 12, for example, is mounted on a wheel hub 13 which carries a brake disc 14. A brake caliper 15 cooperates with the brake disc 14 and the hub and the caliper are carried on a knuckle 16. The knuckle is connected to a suspension strut 17 at its upper end and is carried by a pivoted link 18 at its lower end. A power steering rack is shown at 19 and is connected to the knuckles by ball joints such as 20. Each hub is driven by a driveshaft as shown for the wheel at 11 and 21. The driveshaft drives the inner member of a fixed constant velocity joint, the boot of which is shown at 22. The outer member of the constant velocity joint is connected to drive a hub such as 13.

Figure 2:
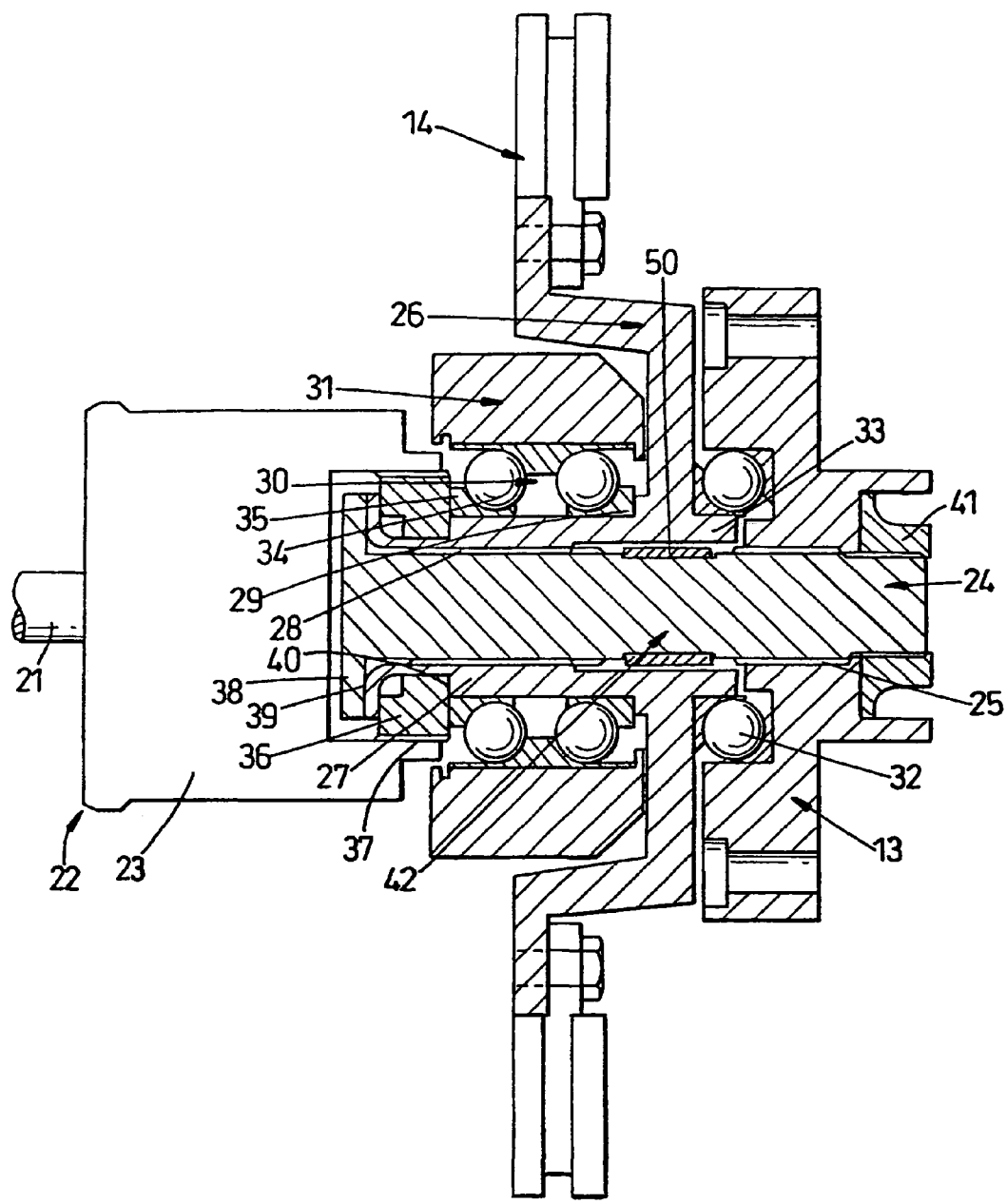
FIG. 2 is a vertical cross section of a drive assembly embodying the invention.

FIG. 2 shows in diagrammatic form an embodiment of the invention. Referring to FIG. 2, and relating it to FIG. 1, the driveshaft 21 is connected to a universal joint, more specifically, the inner member, not shown, of a constant velocity joint 22. The joint includes an outer race 23 which is connected to the wheel hub 13 as will now be described.

There is a drive element 24 in the form of a shaft. Adjacent to the right hand end of the shaft in FIG. 2 there is a splined connection 25 between the hub 13 and the shaft 24. A brake element is shown at 26, the outer part of which carries the brake disc 14. The brake element 26 has an inner limb 27 which is splined at 28 to the shaft 24 adjacent to its left hand end. The inner limb 27 carries one inner race 29 of a two-row rolling element bearing 30. The outer race 31 thereof being supported in a knuckle such as 16, not shown in FIG. 2.

There is an additional single-row rolling element bearing 32 between the hub 13 and the inner limb 27 of the brake element which has a flange 33 carrying the inner race of the bearing, the outer race of which is carried by the hub.

The rolling elements of the bearing 30 are indicated at 34 and the inner race 35 of the left hand row of elements is held in position by a ring 36. The outer periphery of the ring is splined and the outer race 23 of the CV joint has an internally splined flange 37 which engages with the splines on the ring 36. A circlip, not shown, holds the outer race 23 on the ring 36 so that the outer race is fixed both axially and rotationally to the ring. The connection of the bearing 30 and the flange 22 may be as described in the Application No. PCT/GB98/02681.

At its left hand end, the shaft 24 has a flange 38 which engages a flange 39 of the inner limb 27 which has been outwardly formed to secure the ring 36 to the inner limb 27. The ring 36 drivingly engages a shoulder 40 on the inner limb 27. The flange 38 is held against the flange 39 by a nut 41 at the right hand end of the drive element 24. Thus the nut 41 holds together the hub 13, the bearing 31, and the combined bearing 30 and constant velocity joint 22.

The drive element 24 is driven from the outer race of the constant velocity joint via the limb 27 and the splined connection 28 and drives the hub 30 through the spline connection 25. The brake disc 14 is also connected to the drive element 24 via the brake element 26 and the splined connection 28. It will be noted that the rotational connection between the brake disc 14 and the drive element 24 via the splined connection 28 is separate, and spaced apart along the drive element from, the drive connection between the drive element 24 and the hub 13 which is via the splined connection 25.

There is an intermediate plain part 42 of the drive element between the splined connections 25 and 28 and this plain part is equipped with a torque sensor 50 which can sense either the torque in the drive element 24 and/or the change in torque in the drive element. The torque sensor can sense torque applied to the wheel carried by the hub 13 when the wheel is being driven by the hub 13. The torque sensor can also sense the torque transmitted by the wheel when braked by means of the brake disc 14 which is connected to the drive element by the splined connection 28.

Figure 3:
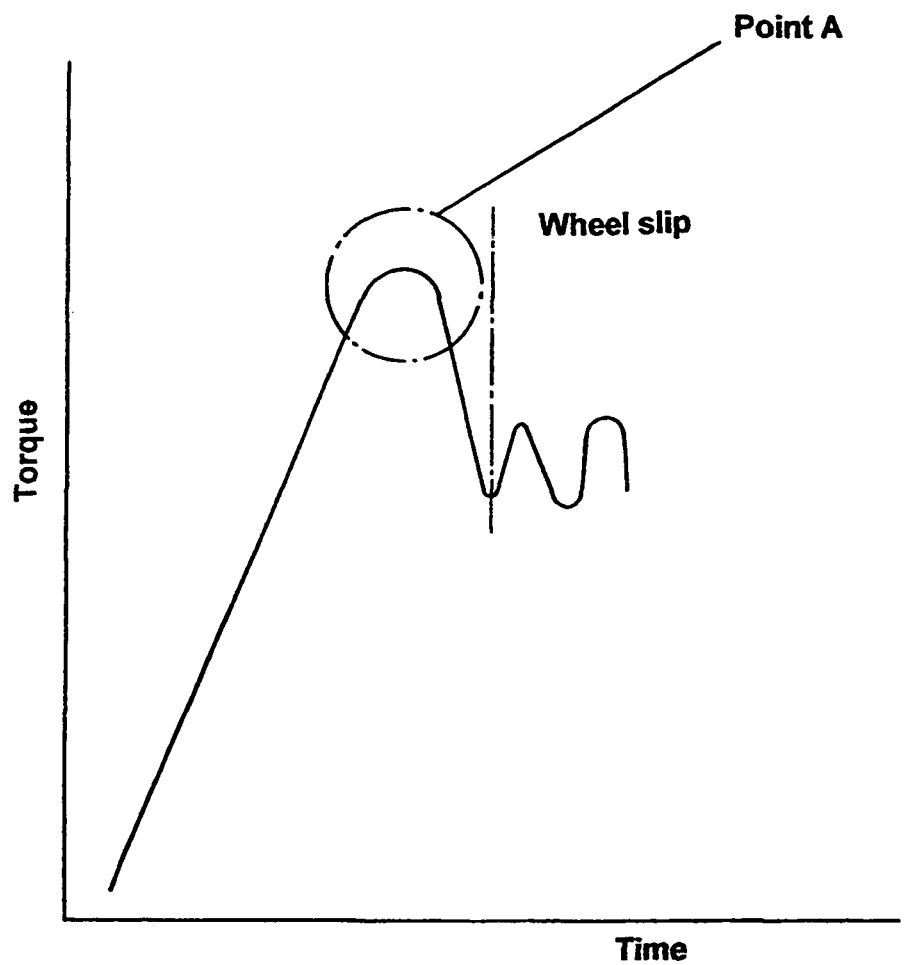
FIG. 3 is a torque/time curve of the torque experienced by a road wheel as it reaches the point of slipping.

The torque transmitted by a road wheel is dependent on the coefficient of friction between the tire contact patch and the road surface. For a measured torque it is possible to assume a coefficient of friction and use a control algorithm to provide ABS and traction control, but the assumption would not be able to take into consideration the degradation of the tire or the change of road surface due to wear or environment. IT is therefore more realistic to use the shape of the torque curve of the torque transmitted by the road wheel. Consider point A in FIG. 3, at this point the tire's grip is about to become inadequate, no slip has as yet occurred, but it is likely to, unless corrected. This "rate of change of torque" can be measured and at a pre-set level (and in conjunction with other vehicle factors e.g. throttle position, manifold effective pressure, and gear position) a corrective action can be applied to the road wheel, in the form of reducing or re-directing the supplied drive torque, or reducing the braking effort of that road wheel, independent of any other road wheel. This could also be achieved by interposing control directly on or by the engine management system. By doing this the system offers a time advantage over speed sending (for example 15 to 20 milliseconds) added to the associated reduction in power loss in the system.

The torque signal so obtained may be used for a variety of purposes thus it may act as a signal for an ABS system to prevent wheel slip during braking and/or an input for a traction control system to prevent wheel slip during driving.

Figure 4:
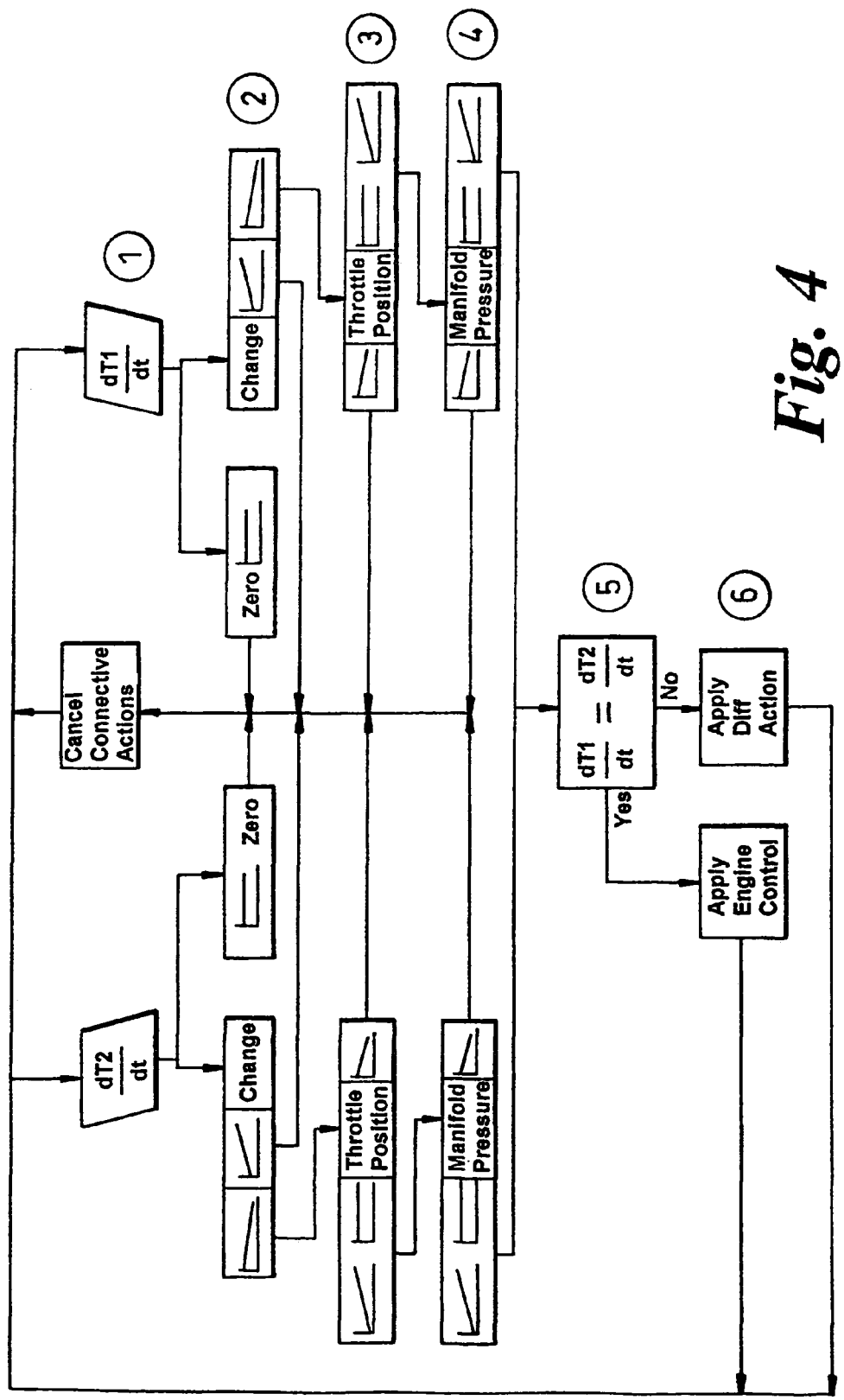
FIG. 4 is a schematic view of a traction control system to which the invention can be applied.

Referring now to FIG. 4, this is a schematic view of a traction control system in which the invention could be used.

At level 1 the change of rate of torque dT with time will be measured for each driven wheel. Thus one gets inputs of dT1/dt and dT2/dt. The rate of change of torque for each driveshaft can then be compared with the previously measured rate in level 2 so that the duty of the driveshaft can be gauged.

In level 3, the output of level 2 is compared with the change in throttle position over the period that the change in torque has been measured and this gives a measure of the driver's requirements.

In level 4, the signal from level 3 can be compared with the engine's response so as to obtain the actual torque delivered to the driveshaft.

In level 5, the changes in torque in the two wheels (dT1/dt and dT2/dt) are compared. If they are equal then, in level 6, the engine control is applied. If they are unequal, which indicates that one of the wheels is slipping, control of the differential action will be applied to transfer some of the torque from the slipping wheel to the non-slipping wheel.

While the invention has been described with reference to traction control system, it could equally be used with an ABS system which is merely the reverse of a traction control system to prevent wheel locking during braking.

Additionally, the input signals obtained could be used to control an automatic gearbox in a vehicle to obtain smooth shifts and/or to provide input into active differentials which split the torque across output shafts. It may also be used in other systems which give automatic yaw control.

Advantages of the system described are:—
(i) The torque sensor 50 on the part 42 is protected from the elements;
(ii) There is a direct correlation between the wheel traction and the torque sensed whether it be driving torque or braking torque; and
(iii) The system is compact and requires no maintenance nor does it require any calibration.

It is envisaged that the invention will be used to sense driving and braking torque in driven wheels as described. However it would also be possible to utilise the invention for sensing the braking torque in non-driven wheels. The arrangement would be similar to that shown in FIG. 2 except that the drive element 24 would not be driven. In a front wheel drive vehicle for example the front wheels could be arranged as in FIG. 2 and the rear, non-driven wheels, as shown in FIG. 2 except that the element 24 is not driven.

The invention claimed is:
1. A rotatable assembly for a road wheel in a vehicle comprising a vehicle suspension knuckle, a drive shaft, a first bearing carried by the knuckle for supporting the drive shaft for rotation, a wheel hub connected to the drive shaft to be driven thereby, a brake disc support rotatably carried by the first bearing and connected to the drive shaft to rotate therewith, the connection between the brake disc support and the drive shaft being separated from and spaced apart from the connection between the drive shaft and the wheel hub, a second bearing between the wheel hub and the brake disc support to support the wheel hub and to allow relative rotation between the brake disc support and the wheel hub, and a torque sensor located between the connection of the drive shaft to the brake disc support and the connection of the drive shaft to the wheel hub to sense the torque or the change in torque being transmitted by the drive shaft.

2. A rotatable drive assembly according to claim 1 wherein the first bearing has inner and outer races with interposed rolling elements and wherein a portion of the brake element which is connected to the drive element supports or provides at least part of said inner race.

3. A rotatable drive assembly according to claim 1 wherein the drive shaft is connected to one part of a universal joint, the other part of the universal joint being connected to a vehicle drive.

* * * * *